Aug. 9, 1949.  D. M. KROENER  2,478,198
RULE
Filed Oct. 26, 1946
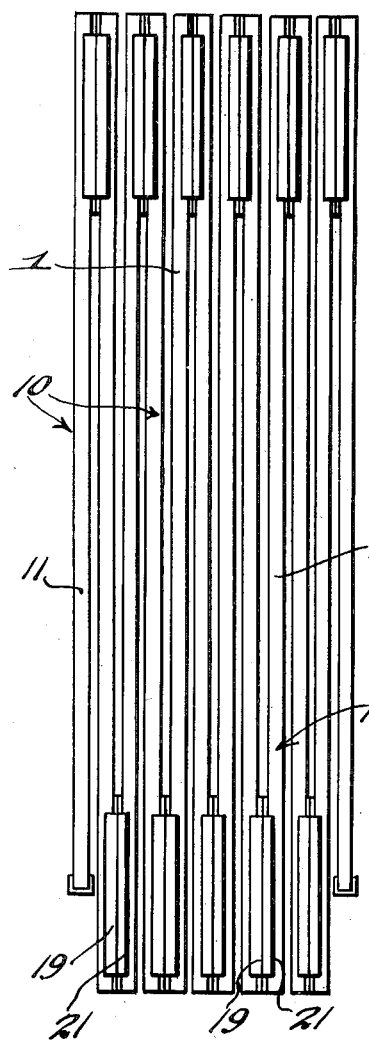
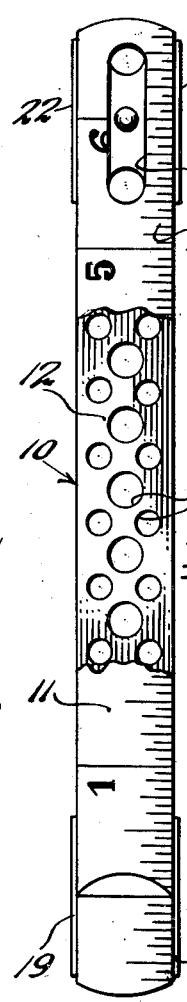
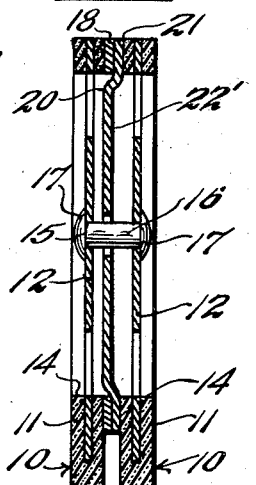
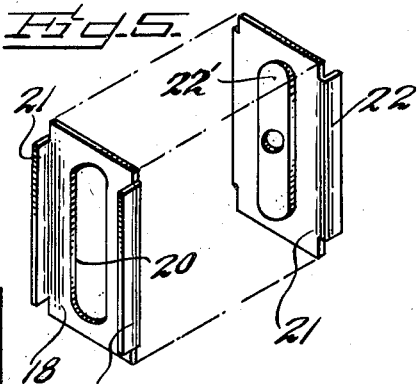
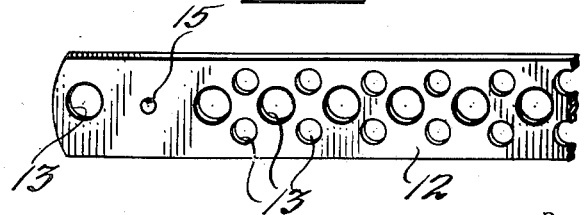
Inventor
DELBERT M. KROENER.
By Clarence A. O'Brien
and Harvey B. Jacobson
Attorneys Patented Aug. 9, 1949

2,478,198

UNITED STATES PATENT OFFICE 2,478,198

RULE

Delbert M. Kroener, Dayton, Ohio

Application October 26, 1946, Serial No. 705,968

1 Claim. (Cl. 33—105)

This invention relates to a rule and more particularly to an extensible mechanic's rule such as may be used by carpenters and the like.

The primary object of the invention is to measure lineal distances of from fractions of an inch to several feet, and at the same time facilitate the carrying of the rule in the pocket of the user.

Another object of the invention is to facilitate the use of plastic substances commonly referred to as synthetic resins in rules of the type to which this invention relates.

Among its features my invention embodies a flat elongated body of synthetic resin, at least one face of which is divided into units of length and a metallic reinforcing strip wholly enclosed within said body to lend both tensile strength and rigidity thereto.

Other features include a plurality of flat elongated bodies of synthetic resin each having graduations along opposite side edges of opposite faces, a perforated metallic reinforcing strip embedded in each body, each body being provided adjacent opposite ends with oppositely disposed grooves through which certain areas of the reinforcing strips are exposed, pivots extending through the reinforcing strips of adjacent bodies to form an extensible rule, and friction plates carried by the bodies adjacent the pivots for holding the rule extended or folded.

In the drawings:

Figure 1 is a side view of a rule embodying the features of this invention showing the same in its folded condition.

Figure 2 is an edge view of Figure 1, certain portions of the synthetic resin covering of the top most blade of the rule being broken away more clearly to illustrate the reinforcing member.

Figure 3 is a fragmentary enlarged sectional view through one end of a pair of joined blades of the rule.

Figure 4 is a perspective view of one of the friction plates.

Figure 5 is a perspective view of a cooperating friction plate, and

Figure 6 is a fragmentary perspective view of the reinforcing strip employed in each rule blade.

Referring to the drawings in detail, my improved rule comprises a plurality of flat elongated bodies designated generally 10 each of which includes a flat elongated body member 11 formed of synthetic resin molded in the desired form, and having embedded therein a reinforcing strip of metal 12 which is preferably perforated as at 13 to receive the resin and firmly anchor the parts together. Formed adjacent each end of each strip 10 and opening into opposite side faces thereof to expose portions of the reinforcing strip 12 adjacent opposite ends are grooves 14, and formed in the exposed portions of the reinforcing strips are aligned openings 15 for the reception of pivot pins 16 which are headed over as at 17 in such a manner that the heads lie wholly within the confines of the grooves 14.

A friction plate 18 is secured to each body 11 as by suitable attaching flanges 19 adjacent one end thereof, and this friction plate is provided with an elongated opening 20 which aligns with a groove 14 formed in the body. A cooperating friction plate 21 is secured to the opposite end of each flat elongated body 11 as by attaching flanges 22 and the central portion of each friction plate 21 is provided with an elongated up-struck portion 22' which is adapted to cooperate with the walls of the elongated opening 20 of a wear plate 18 carried by the next adjacent body 11 as will be readily understood upon reference to Figure 3 to hold the parts in either folded or extended position according to the desires of the user.

In use it will be understood that the rule is employed in the manner of the conventional folding rules of this type and the flat faces of the elongated body members 11 are graduated or divided as at 24 into suitable units of measurement.

Due to the pivotal connections of the reinforcing strips 12 with one another it will be obvious that any strain imparted to the rule will be absorbed by the reinforcing strips and consequently the plastic or synthetic resin covering or bodies 11 of the reinforcing strips 12 will be protected from strain and injury. By thus constructing such a rule it is possible to employ synthetic resins of various different colors upon which the graduations or divisions 23 may be rendered easily visible, and at the same time the serviceability of the resin remains unimpaired as strains or stresses are absorbed directly by the reinforcing strips 12.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

A rule comprising a plurality of flat elongated blades of synthetic resin each having graduations along one side edge of at least one face, a perforated metal reinforcing strip embedded in each blade, each blade having an elongated groove in each face adjacent each end exposing a portion of the reinforcing strip embedded therein, each exposed portion of each reinforcing strip having a pivot opening therein, a friction plate on one side of each blade adjacent one end thereof; a like friction plate on the opposite side of each blade adjacent the oposite end thereof, said friction plates having elongated openings therein which register with an elongated groove in its respective blade; a friction plate on each side of each blade opposite the first mentioned friction plates; an elongated longitudinally extending boss on each last mentioned friction plate for entrance into the elongated opening in the friction plate of an adjacent blade when the rule is extended or folded; each such boss having an opening extending therethrough in alignment with the pivot opening in the reinforcing strip of its respective blade; and a pivot pin extending through the last mentioned opening, the opening in the boss and the pivot opening in the reinforcing strip of an adjacent blade, and a head on each end of each pivot pin engaging the reinforcing strips of adjacent blades.

DELBERT M. KROENER.

REFERENCES CITED

The following references are of record in the file of this patent:

UNITED STATES PATENTS

| Number | Name | Date |
|---|---|---|
| 312,485 | Makin | Feb. 17, 1885 |
| 1,211,458 | Leavens | Jan. 9, 1917 |
| 2,021,202 | Sauer | Nov. 19, 1935 |
| 2,182,027 | Little | Dec. 5, 1939 |